Nov. 17, 1964 M. K. HAYNES 3,157,778

MEMORY DEVICE

Filed May 18, 1960 2 Sheets-Sheet 1

MEMORY DEVICE

Filed May 18, 1960 2 Sheets-Sheet 2

INVENTOR.
MUNRO K. HAYNES

BY

Thomas & Crickenberger 3,157,778
MEMORY DEVICE
Munro K. Haynes, Poughkeepsie, N.Y., assignor to International Business Machines Corporation, New York, N.Y., a corporation of New York
Filed May 18, 1960, Ser. No. 30,030
4 Claims. (Cl. 235—92)

This invention relates to memory devices and more particularly to such devices in which words stored therein may be operated upon and transferred from one register to another within the memory device.

In various types of computing devices employing memory systems it is customary to read information from the memory, perform operations on the information and return the new information to the memory device. The time involved includes one memory cycle to get the information, another memory cycle to return the information, and enough time to perform operations on the information while it is outside of the memory device. Auxiliary equipment external to the memory device is employed for storing the information while these operations are being performed, and this involves in some instances an increase in the cost of manufacture and repair of the computing device.

In order to overcome or alleviate some of the foregoing difficulties, this invention provides a memory device with which information may be operated upon within the memory device, thereby minimizing the time involved in operating upon the information and in some instances reducing the need for auxiliary equipment external to the memory device.

In one arrangement according to this invention information is stored in a memory device including a plurality of registers arranged to form the rows in an array configuration. Each register has a plurality of storage positions formed from superconductive persistent current loops. Corresponding storage positions in the registers make up the columns in the array configuration. Cryotron elements are used to control the information currents in the system, and the presence or absence of currents in the storage position loops provides indications of the binary data stored. The data is operated upon by adding one to the word in any selected register in the memory device. A word from a selected register may be incremented by one, and the new word may be returned to the same register, to any other register or to any combination of registers in the memory device. A word stored in a selected register also may be read to an external device simultaneously as the word is incremented by one, and the increment word may be stored in a selected one or all or any combination of the registers in the memory.

The flexible memory device of this invention may take numerous forms in practice. It is adaptable to numerous types of bistable storage devices, and it is especially suitable for use with cryotrons and other cryogenic devices. The invention is illustrated herein with the use of cryotrons, but it is to be understood that the invention is not limited to cryotrons or cryogenic devices since other types of bistable storage devices may be equally well employed.

The foregoing and other features of this invention may be more fully appreciated when considered in the light of the following specification and the drawings in which.

Figures 1, 2, 4:
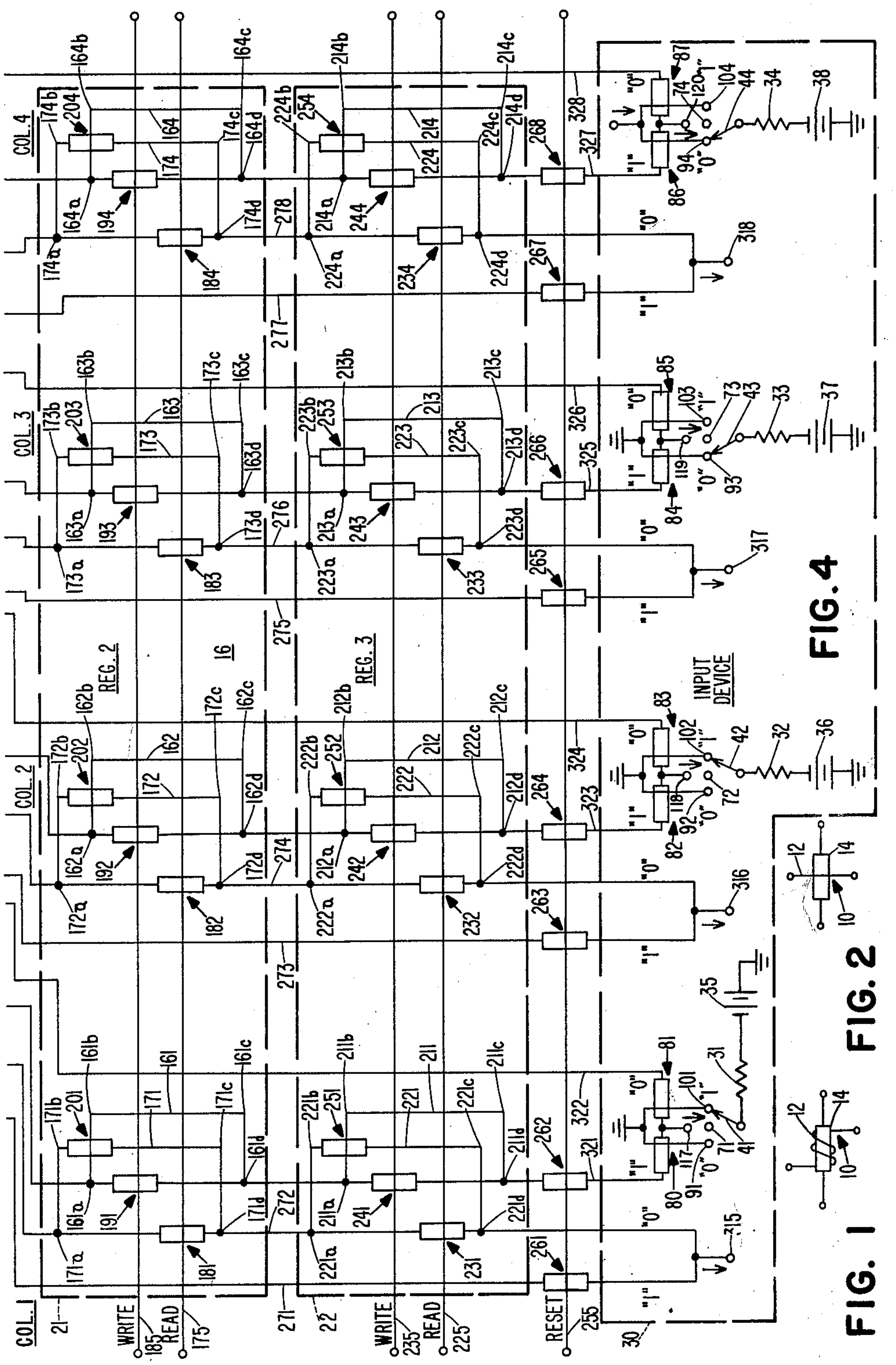
FIG. 1 illustrates a cryotron in schematic form.
FIG. 2 is a symbol employed throughout FIGS. 3 and 4 to represent the cryotron illustrated in FIG. 1.
FIGS. 3 and 4 illustrate a memory device constructed according to this invention.

Referring first to FIG. 1, a cryotron 10 is illustrated as having a winding 12 disposed about a gate element 14. While this cryotron is represented as a conventional wire-wound cryotron in the interest of providing a more graphic circuit illustration, it is to be understood that the cryotron may be constructed of thin film devices of the type such as those shown and described in copending application Serial No. 625,512 filed on November 30, 1956, by R. L. Garwin and assigned to the assignee of this invention. The circuit schematic of the cryotron 10 in FIG. 1 is depicted in FIG. 2 in a more simplified form. The same reference numerals employed in FIG. 1 are used in FIG. 2 to designate corresponding parts. The winding 12 in FIG. 1 is represented in FIG. 2 by the vertical conductor 12 disposed across the gate element 14. The simplified legend of FIG. 2 is employed in FIGS. 3 and 4 to represent a cryotron such as that illustrated in FIG. 1.

The circuits of this invention are operated at low temperature by immersion in liquid helium, for example. The circuit lines or wires and the control coils of each cryotron are made of a hard superconductor such as niobium and the gate element of each cryotron is made of a soft superconductor such as tantalum. The currents employed create a magnetic field in the control coil which exceeds the critical field of the gate, but the magnetic field does not exceed the critical field of the control coil or the connecting lines or wires. Accordingly, the gate element of the cryotron is driven resistive when current flows in the control coil of the cryotron, and the gate element is superconductive when no current flows in the control coil or when a current of magnitude less than critical current of the gate flows in the control coil.

Figure 3:
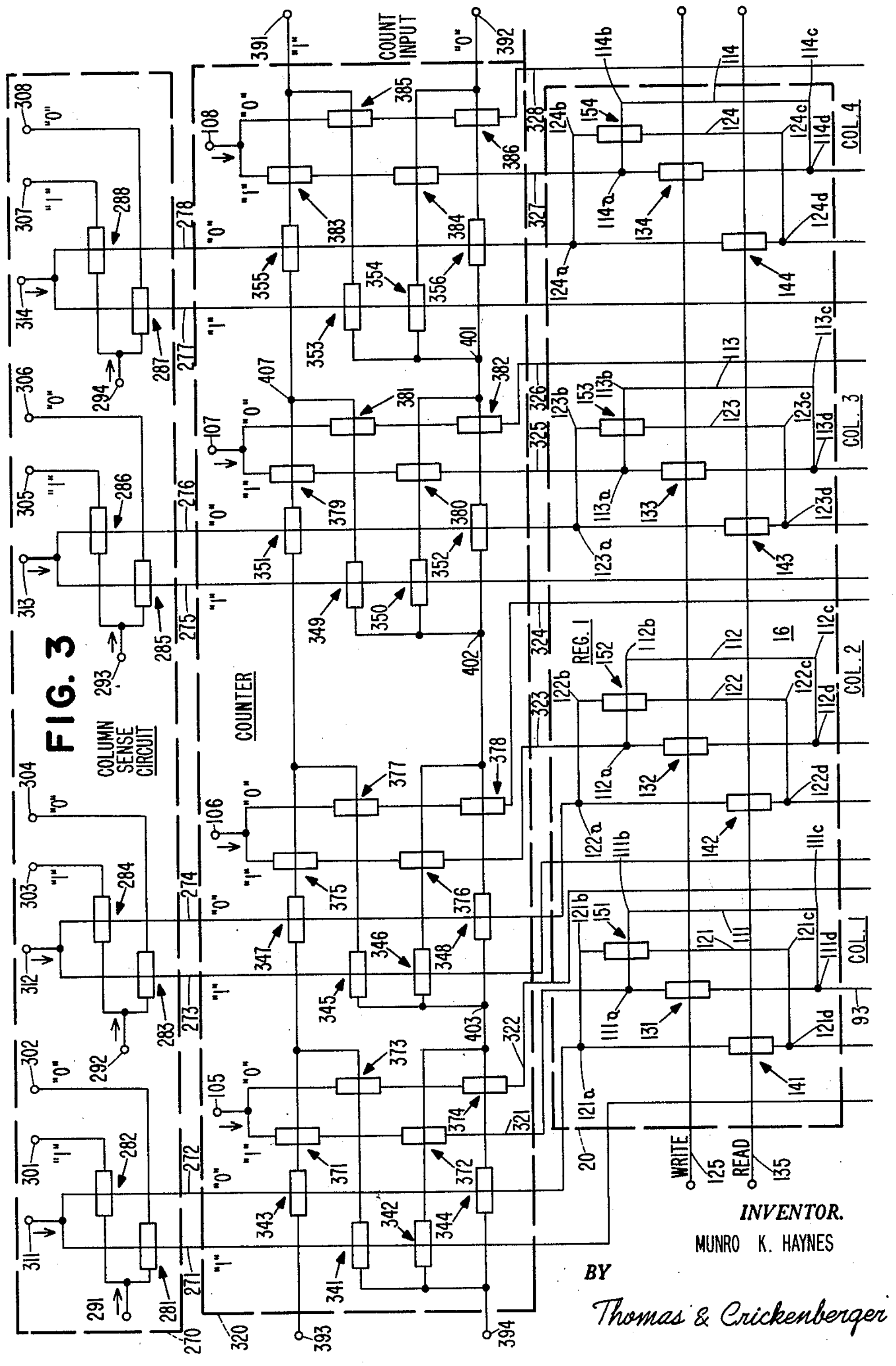

Referring next to FIGS. 3 and 4, an array 16 is illustrated as having registers 20, 21 and 22. It is to be understood that the array 16 may be changed in size as desired by increasing or diminishing the number of registers or the number of storage positions in each register. Information to be written into the array 16 in FIGS. 3 and 4 is supplied by an input device 30 which may take numerous forms. The input device 30 is illustrated as having resistors 31 through 34 connected in series with respective batteries 35 through 38 which serve as current sources. Switches 41 through 44 are connected to respective resistors 31 through 34. While the switches 41 through 44 are illustrated as mechanical switches, they may be electrical or electronic devices in practice. The switches 41 through 44 are closed to the right or the left to represent binary information.

For purposes of illustration it is arbitrarily assumed that when the switches are closed to the left a binary zero is represented, and when they are closed to the right a binary one is represented. When the switches 41 through 44 are closed on respective contacts 71 through 74, no information is represented. The switches are normally closed on the respective contacts 71 through 74, and they are switched to the left or the right to represent binary information when the input device 30 is employed to supply signals representative of information to the array 16. The switch 41 controls battery currents applied to cryotrons 80 and 81, and the switch 42 controls the battery currents applied to the cryotrons 82 and 83. In like fashion, the switch 43 controls the battery currents applied to the cryotrons 84 and 85, and the switch 44 controls the battery currents applied to the cryotrons 86 and 87. The switches 41 through 44 are closed to the left on respective contacts 91 through 94 to represent a binary zero, and this drives the gates of respective cryotrons 80, 82, 84 and 86 resistive. The switches 41 through 44 are closed to the right on respective contacts 101 through 104 to represent a binary one, and this drives the gates of the respective cryotrons 81, 83, 85 and 87 resistive. Currents are applied to terminals 105 through 108 in FIG. 3 during a write operation, and these currents flow on associated ones of the lines 321 through 328 to corresponding exit terminals 117 through 120.

The register 20 in FIG. 3 includes storage loops 111 through 114 which are associated with respective sense loops 121 through 124. The loops of this register are defined by the points A, B, C and D associated with the loop number. A write line 125 is employed when a writing operation is to take place in register 20, and a current on this line drives the gates of cryotrons 131 through 134 resistive. A read line 135 is employed when a reading operation is to take place from the register 20, and a current on this line drives the gates of cryotrons 141 through 144 resistive. Cryotrons 151 through 154, disposed in respective sense loops 121 through 124, are employed during a readout operation as sensing devices.

The register 21 in FIG. 4 includes storage loops 161 through 164 associated with respective sense loops 171 through 174. Each of these loops in register 21 are defined by points A, B, C and D associated with the loop number. A read line 175 is employed for reading information from the register 21, and a current on this line drives the gates of cryotrons 181 through 184 resistive. A write line 185 is employed for writing information into the register 21, and a current on this line drives the gates of cryotrons 191 through 194 resistive. Cryotrons 201 through 204, disposed in respective sense loops 171 through 174, are employed during a readout operation from register 21 as sensing devices.

Register 22 in FIG. 4 includes storage loops 211 through 214 associated with respective sense loops 221 through 224. A read line 225 is employed when reading from the register 22, and a current on this line drives the gates of cryotrons 231 through 234 resistive. A write line 235 is employed when writing information into the register 22, and a current on this line drives the gates of cryotrons 241 through 244 resistive. Cryotrons 251 through 254, disposed in respective sense loops 221 through 224, are employed during a read operation from the register 22 as sense devices. A reset line 255 in FIG. 4 is employed for a reset operation which takes place before each read or write operation involving any one of the registers 20 through 22. A current on the reset line 255 drives the gates of cryotrons 261 through 268 resistive to effect the reset operation.

When information is read from any one of the registers 1 through 3 of FIGS. 3 and 4, it passes out through a column sense circuit 270 to a utilization device not illustrated. Information signals are supplied from columns 1 through 4 of the registers 1 through 3 along vertical lines 271 through 278 which run through FIGS. 3 and 4. These lines are associated with the columns as illustrated, and currents on the respective lines 271 through 278 control respective cryotrons 281 through 288 in the column sense circuit 270. Currents from the terminals 291 through 294 are supplied to the gates of the cryotrons 281 through 288 in the manner illustrated in FIG. 3. Currents on the output terminals 301 through 308 represent binary information. A binary one is represented whenever currents flow to the terminals 301, 303, 305 or 307. A binary zero is represented whenever currents flow to the terminals 302, 304, 306 or 308. Currents supplied to the terminals 311 through 314 control the cryotrons 281 through 288. Currents applied to these terminals exit through respective terminals 315 through 318 in the lower portion of FIG. 4.

A counter 320 in FIG. 3 is provided which may be employed to increment information supplied thereto. The vertical lines 271 through 278 supply information to the counter 320, and the incremented information is supplied from the counter to the registers 1 through 3 in FIGS. 3 and 4 on vertical lines 321 through 328 which pass through FIGS. 3 and 4. Considering first the input lines 271 through 278, the input line 271 controls cryotrons 341 and 342. The line 272 controls the cryotrons 343 and 344. The line 273 controls the cryotrons 345 and 346, and the line 274 controls the cryotrons 347 and 348. The line 275 controls the cryotrons 349 and 350 while the line 276 controls the cryotrons 351 and 352. The line 277 controls the cryotrons 353 and 354 while the line 278 controls the cryotrons 355 and 356.

Considering next the output lines from the counter 320 in FIG. 3, the line 321 includes the gates of cryotrons 371 and 372, and the line 322 includes the gates of the cryotrons 373 and 374. The line 323 includes the gates of the cryotrons 375 and 376, and the line 324 includes the gates of the cryotrons 377 and 378. The line 325 includes the gates of the cryotrons 379 and 380, while the line 326 includes the gates of the cryotrons 381 and 382. The line 327 includes the gates of the cryotrons 383 and 384, while the line 328 includes the gates of the cryotrons 385 and 386. The counter 320 includes input terminals 391 and 392. If the content in the counter is to be incremented by one, the terminal 391 is supplied with the current, and if the content of the counter is to remain unchanged, the terminal 392 is supplied with the current. Output terminals 393 and 394 from the counter 320 are provided, and if the terminal 393 receives a current, this indicates an overflow condition. If the terminal 394 receives a current, this indicates there was no overflow.

For the purpose of illustrating a writing operation where the information to be written is supplied by the input device 30, let it be assumed that a writing operation is to take place in register 3 and that the binary word to be written is 1100. In order to write the binary word 1100 in the respective columns 1 through 4 of register 3, the switches 41 through 44 are closed in the manner illustrated in FIG. 4. At this point currents are applied to the input terminals 105 through 108 in FIG. 3. Currents passing through the switches 41 through 44 of the input device 30 in FIG. 4 drive the gates of cryotrons 81, 83, 84 and 86 of respective columns 1 through 4 resistive. Consequently, current flows in columns 1 through 4 on respective vertical lines 321, 323, 326 and 328. At this point the write line 235 is energized with a current, and this drives the gates of the cryotrons 241 through 244 resistive. As a result, currents in the vertical lines 321 and 323 are diverted through the portions of the storage loops 211 and 212 defined by the points *a*, *b*, *c* and *d* associated with the loop number.

Since the vertical lines 325 and 327 in respective columns 3 and 4 carry no current, the resistive gates of the cryotrons 243 and 244 dissipate any persistent currents which previously may have been stored in respective storage loops 213 and 214. The application of current to the write line 235 may be discontinued at this time. Nevertheless currents from the terminals 105 and 106 in FIG. 3 continue to flow on the lines 321 and 323 of respective columns 1 and 2, and these currents flow through the portions of respective storage loops 211 and 212 defined by the points *a*, *b*, *c* and *d* associated with the loop number. This is because current flowing in one superconductive path does not change to a parallel superconductive path unless forced to do so. At this point the application of current to the terminals 105 through 108 in FIG. 3 may be discontinued.

The termination of currents to the terminals 105 through 108 causes persistent currents to be established in the storage loops 211 and 212 of respective columns 1 and 2 of register 3. No persistent currents are established in the storage loops 213 and 214 of respective columns 3 and 4 of register 3. The presence of a persistent current in a storage loop is arbitrarily assumed to represent a binary one, and the absence of a persistent current is arbitrarily assumed to represent a binary zero. Accordingly, the persistent currents in the loops 211 and 212 of register 3 represent binary ones and the absence of persistent currents in the storage loops 213 and 214 represent binary zeros. Thus, the word 1100 is stored in respective columns 1 through 4 of register 3. For a more detailed description concerning the establishment of persistent currents in storage loops such as storage loops 211 through 214 in register 3, reference may be made to copending application Serial No. 30,019, filed on May 18, 1960, by Munro K. Haynes and which is assigned to the assignee of this invention.

Next a readout operation is illustrated where a word is to be read from a selected register to an output device, not shown, through the column sense circuit 270 in Fig. 3. For this purpose let it be assumed that register 3 is selected, and that the binary word 1100, earlier stored therein, is to be supplied to a load device. First, currents are applied to terminals 311 through 314 of the column sense circuit 270 in Fig. 3. Next, a reset pulse is applied on the reset line 255, and this drives the gates of the cryotrons 261 through 268 resistive. Since the only concern here is a readout operation involved in the column sense circuit 270, the vertical lines 321 through 328 may be disregarded for present purposes. Energization of the reset line 255 causes current supplied to the terminals 311 through 314 to be diverted along respective vertical lines 272, 274, 276 and 278 to corresponding exit terminals 315 through 318. Currents on these vertical lines are arbitrarily assumed to represent binary zeros. If currents are established on respective vertical lines 271, 273, 275 and 277 as a result of a read operation they are arbitrarily assumed to represent binary ones. Current to the reset line 255 in Fig. 4 is terminated at this point. Next, a current is applied to the read line 225 of register 3, and this drives the gates of the cryotrons 231 through 234 resistive.

Considering first what happens in column 1, the gates of the cryotrons 231 and 251 are resistive. The gate of the cryotron 231 is resistive because a current is flowing in the read line 225, and the gate of the cryotron 251 is resistive because a persistent current is circulating in the storage loop 211. Accordingly, current from the terminal 311 in Fig. 3 is diverted from the vertical line 272 to the vertical line 271.

Considering next what happens in column 2, the gate of the cryotron 232 is resistive because the current is flowing in the read line 225, and the gate of the cryotron 252 is resistive because a persistent current is circulating in the storage loop 212. As a consequence, current from the terminal 312 in Fig. 3 is diverted from the vertical line 274 to the vertical line 273.

In columns 3 and 4, the gates of the cryotrons 253 and 254 in respective columns 3 and 4 are superconductive because no persistent current is circulating in the respective storage loops 213 and 214. Consequently, currents on the vertical lines 276 and 278 in respective columns 3 and 4 are diverted through the gates of respective cryotrons 253 and 254 in register 3 because the gates of associated cryotrons 233 and 234 are resistive. Thus, the currents from terminals 313 and 314 in respective columns 3 and 4 continue to flow in respective vertical lines 276 and 278.

In the column sense circuit 270 in Fig. 3, the current in the vertical line 271 of column 1 drives the gate 281 resistive and diverts current from the terminal 291 through the superconductive gate of the cryotron 282 to the output terminal 301, representing a binary one. In column 2, current in the vertical line 273 drives the gate of the cryotron 283 resistive and diverts current from the terminal 292 through the superconductive gate of the cryotron 284 to the output terminal 303, representing a binary one. In column 3, current on the vertical line 276 drives the gate of the cryotron 286 resistive and diverts current from the terminal 293 through the superconductive gate of the cryotron 285 to the output terminal 306, representing a binary zero.

In column 4 current on the vertical line 278 drives the gate of the cryotron 288 resistive and diverts current from the terminal 294 through the superconductive gate of the cryotron 287 to the output terminal 308, representing a binary zero. It is seen, therefore, that currents on output terminals 301, 303, 306 and 308 represent the binary number 1100. Accordingly, the binary number 1100 stored in respective columns 1 through 4 of register 3 is presented through the column sense circuit 270 to a utilization device not illustrated. Current on the read line 225 may be terminated as soon as currents from the terminals 311 through 314 have been diverted from the lines 272, 274, 276 and 278, if current is to be diverted from these lines, and as soon as currents from the terminals 291 through 294 have operated the load device not illustrated, they may be terminated. Finally, currents on the terminals 311 through 314 may be terminated.

It is pointed out that during a read operation the column sense circuit 270 and the vertical lines 271 through 278 are utilized, and that during a writing operation the input device 30 and the vertical lines 321 through 328 are utilized. The use of one set of vertical lines for a reading operation and another set of vertical lines for a writing operation makes it possible to perform the two operations simultaneously. For example, a word may be written in register 3 simultaneously as another word is read from register 2. During a counting operation both sets of these vertical lines are employed.

In order to illustrate a counting operation, let it be assumed that the binary word 1100 is stored in register 3 and that this word is to be increased by the value of one and the new word restored in register 3. First, currents are applied to terminals 105 through 108 of the counter 320 in Fig. 3, and currents are applied to the terminals 311 through 314 of the column sense circuit 270 in Fig. 3. Next, the reset line 255 is energized with a current, and this drives the gates of the cryotrons 261 through 268 resistive. This diverts currents from the terminals 311 through 314 to associated vertical lines 272, 274, 276 and 278. Also, it diverts currents applied to the terminals 105 through 108 to vertical lines 322, 324, 326 and 328 respectively. The current on the reset line 255 is terminated. Next, the read line 225 is energized with a current, and this drives the gates of the cryotrons 231 through 234 resistive. Because the storage loops 211 and 212 hold persistent currents and the storage loops 213 and 214 hold no persistent currents, currents from the terminals 311 through 314 are diverted to respective lines 271, 273, 276 and 278 for reasons earlier explained.

Considering next the counter 320 in Fig. 3, current on the vertical line 271 drives the gates of the cryotrons 341 and 342 resistive. Current on the vertical line 273 drives the gates of the cryotrons 345 and 346 resistive. Current on the vertical line 276 drives the gates of the cryotrons 351 and 352 resistive. Current on the vertical line 278 drives the gates of the cryotrons 355 and 356 resistive. In order to increment by a value of one, a current is applied to the terminal 391 of the counter 320. Because the gate of the cryotron 355 is resistive, the current from the terminal 391 is diverted through the control winding of the cryotron 385 and the superconductive gate of the cryotron 353 to a junction point 401. The gate of the cryotron 385 is driven resistive, and current from the terminal 108 in column 4 is diverted from the vertical line 328 to the vertical line 327.

The gate of the cryotron 352 in column 3 is held resistive by the current in the vertical line 276. The current from the junction point 401 therefore flows up and to the left through the control winding of the cryotron 380 and a superconductive gate of the cryotron 350 to a junction point 402. The gate of the cryotron 380 is driven resistive, but no change is effected since current from the terminal 107 is flowing in the vertical line 326. Current from the junction point 402 flows to the left through the control winding of the cryotron 378 and the superconductive gate of the cryotron 348 to a junction point 403. The current flows in this path because current on the vertical line 273 drives the gate of the cryotron 346 resistive. Because the gate of the cryotron 378 is driven resistive by the current flowing from the junction point 402 to the junction point 403, current from the terminal 106 in column 2 is diverted from the vertical line 324 to the vertical line 323. Current from the junction point 403 in column 2 flows through the control winding of the cryotron 374 and a superconductive gate of the cryotron 344 to the exit terminal 394. A current to this exit terminal indicates that an overflow did not occur. The current from the junction point 403 flows to the terminal 394 in the path indicated because current on the vertical line 271 drives the gate of the cryotron 342 resistive. The current in the control winding of the cryotron 374 drives this cryotron resistive and diverts current in the vertical line 322 to the vertical line 321 in column 1.

Current on the read line 225 in register 3 may be terminated at this point if it was not earlier terminated. Current on the read line may have been terminated as soon as currents in the vertical lines 272, 274, 276 and 278 were diverted in case such diversion was to take place. Current on the write line 235 in register 3 of FIG. 4 may be initiated at this time if it was not earlier applied. It is pointed out that the read and write lines of register 3 may have been energized simultaneously at the time the read line was energized. Assuming that the write line 235 is energized at this time, it drives the gates of the cryotrons 241 through 244 resistive. Currents on the vertical lines 321, 323 and 327 are diverted by the resistive gates of respective cryotrons 241, 242 and 244 to the portion of the respective storage loops 211, 212, and 214 defined by the points *a*, *b*, *c* and *d* associated with the loop number. No current flows on the vertical line 325 of column 3, and thus no current is supplied to the storage loop 213.

At this point the current on the write line 235 may be terminated, and upon such occurrence the currents in the vertical lines 321, 323 and 327 continue to flow in that portion of respective storage loops 211, 212 and 214 defined by the points *a*, *b*, *c* and *d* associated with the loop number. This is because current flowing in one superconductive path does not change to a parallel superconductive path unless forced to do so. At this point currents supplied to the terminals 105 through 108 are terminated, and persistent currents are established in storage loops 211, 212 and 214 of register 3. No persistent current is established in the storage loop 213. Thus, it is seen that the binary number 1101 is established in respective columns 1 through 4 of register 3. This binary number is one greater in value than the binary number 1100 which was stored in register 3 at the commencement of the counting operation. It is pointed out that the binary number 1101 may have been written in any one or any combination of the registers 1 through 3 merely by energizing the write lines of these registers.

In the foregoing counting operation three of the possible four combinations of a binary one and a binary zero were included. The one case not included is one which involves two binary ones. To illustrate this case using column 4, assume that current flows on the vertical line 277, and a current is applied to the terminal 391. Currents on these lines represent binary ones. The current from the terminal 391 flows to the junction point 407 because the gate of the cryotron 353 is driven resistive by current on the vertical line 277. The current flowing from the terminal 391 to the junction point 407 drives the gate of the cryotron 383 resistive which in turn causes current from the terminal 108 to flow along the vertical line 328, representing a binary zero. Current flowing to the junction point 407 represents a binary one from column 4. Thus one plus one in binary yields a sum of zero and a carry of one which are properly represented by the current on the vertical line 328 and the current flowing on the conductor to the junction point 407.

It is seen therefore that a novel memory arrangement is provided according to this invention which includes a plurality of registers, and data stored therein may be operated upon by adding one to the word in any selected register. The word from a given register may be incremented by one and the incremented value may be returned to the same register. Furthermore, a word from a selected register may be incremented by one and the incremented word may be returned to any one or all or any combination of the registers. A word may be read from any selected register in the memory device to an external load device simultaneously as the same word is incremented and returned to the same register from which it was taken or to any other register or any combination of the registers in the memory device.

What is claimed is:

1. A cryogenic storage device comprising persistent current storage loops arranged in columns and rows to form a plurality of registers, means coupled to each of said columns and each of said rows for writing information in said storage loops, means coupled to each of said columns and each of said rows for reading information from said storage loops simultaneously as the information is written therein, and counter means coupled to each of said columns to increment by one the value of the information stored in any selected register, whereby the incremented information may be rewritten in the selected register or in any other register.

2. The combination according to claim 1 including means to indicate an overflow condition in the counter means.

3. A cryogenic storage device comprising an array of persistent current storage loops arranged in columns and rows to form a plurality of registers, means coupled to each of said columns and each of said rows for writing information in said storage loops, means coupled to each of said columns and each of said rows for reading information from said storage loops simultaneously as the information is written therein, and counter means including cryogenic elements disposed in one row of the array and coupled to each of said columns to increment by one the value of the information stored in any selected register, whereby the incremented information may be rewritten in the selected register or in any other register.

4. The combination according to claim 3 wherein the counter means includes means to indicate an overflow condition.

References Cited in the file of this patent

UNITED STATES PATENTS

| | | |
|---|---|---|
| 2,432,324 | May | Dec. 9, 1947 |
| 2,636,672 | Hamilton et al. | Apr. 28, 1953 |
| 2,700,076 | Goode | Jan. 18, 1955 |
| 2,774,063 | Grinstead | Dec. 11, 1956 |
| 2,954,166 | Eckdahl et al. | Sept. 27, 1960 |
| 2,968,794 | Slade | Jan. 17, 1961 |
| 2,969,469 | Richards | Jan. 24, 1961 |
| 3,004,705 | Bremer | Oct. 17, 1961 |
| 3,017,100 | Houseman | Jan. 16, 1962 |
| 3,019,349 | Sanborn | Jan. 30, 1962 |
| 3,019,353 | Mackay | Jan. 30, 1962 |
| 3,021,439 | Anderson | Feb. 13, 1962 |
| 3,043,512 | Buckingham et al. | July 10, 1962 |
| 3,053,451 | Mackay | Sept. 11, 1962 |

OTHER REFERENCES

"The Cryotron—A Superconductive Computer Component," by D. A. Buck, Proceedings of the IRE, April 1956, pp. 482–493.